R. & G. HARWOOD, J. SCHOLES & T. SEYMOUR.
Internal Deflectors for Flue Boilers.

No. 150,035. Patented April 21, 1874.

Witnesses, Harry Smith
Thomas McIlvain

Richard Harwood.
George Harwood
John Scholes and
Thomas Seymour
by their Attys.
Howson and Son.

UNITED STATES PATENT OFFICE.

RICHARD HARWOOD, GEORGE HARWOOD, JOHN SCHOLES, AND THOMAS SEYMOUR, OF BOLTON, ENGLAND.

IMPROVEMENT IN INTERNAL DEFLECTORS FOR FLUE-BOILERS.

Specification forming part of Letters Patent No. 150,035, dated April 21, 1874; application filed February 21, 1874.

*To all whom it may concern:*

Figure 1:
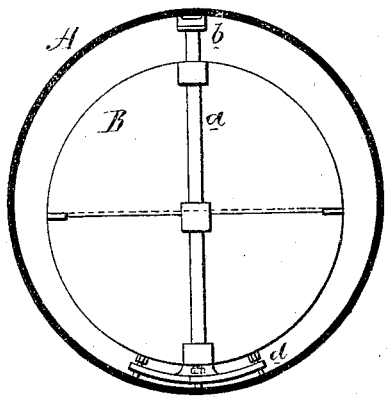
Figure 2:
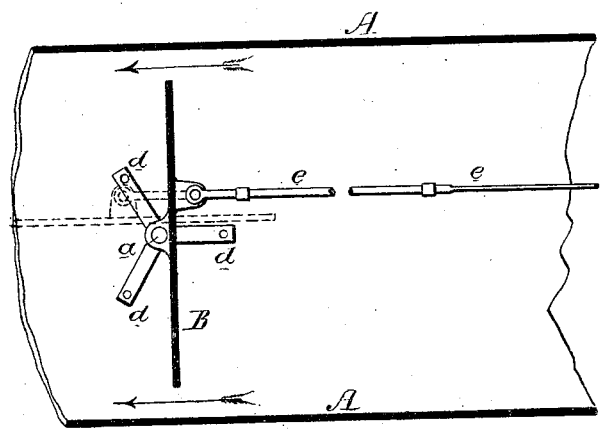

Be it known that we, RICHARD HARWOOD, GEORGE HARWOOD, JOHN SCHOLES, and THOMAS SEYMOUR, all of Bolton, in the county of Lancaster, England, have invented an Improvement in Internal Deflectors for Flue-Boilers, of which the following is a specification:

The object of our invention is to economize the consumption of fuel in the furnaces of flue-boilers, and to obtain the greatest amount of heating effect therefrom, by combining a disk or other deflector, B, with the flue A of the boiler, as shown in the transverse section, Figure 1, and sectional plan, Fig. 2, of the accompanying drawing, the said deflector serving to divide the heated products of combustion, and to direct them against and maintain them in contact with the internal surface of the flue, as fully described hereafter.

Figure 3:
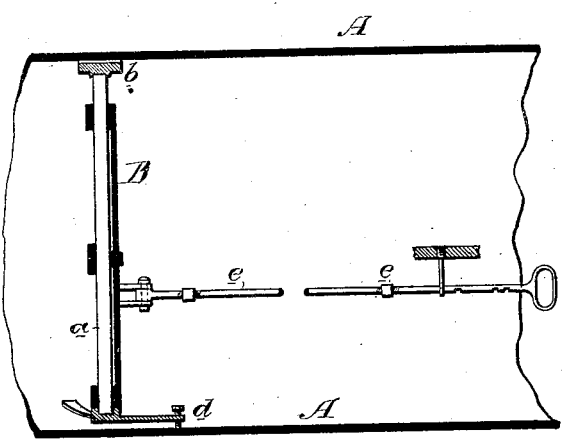
Figure 4:
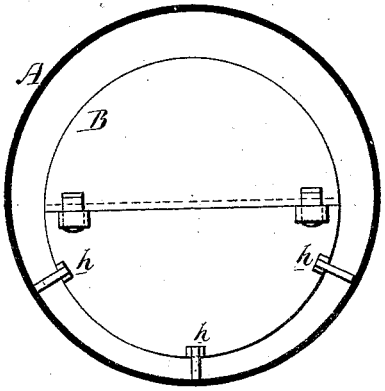

In carrying out our invention, the deflector B may be placed in any part of the internal flue of the boiler—either close to the furnace, in place of a bridge-wall, or at the opposite end of the boiler. It may be made of brick, fire-clay, cast-iron, or any other material which will withstand the heat of the fire, and may be pivoted like a damper, so as to admit of ready adjustment, as shown in Figs. 1, 2, and 3 of the drawing, in which case the said deflector may be of the same or of less diameter than the flue; or it may be fixed transversely within the latter, as shown in the transverse section, Fig. 4. We prefer, however, to make the deflector of less diameter than the flue, so as to spread the flames and heated gases into a tubular form, and cause them to traverse in contact with the whole interior surface of the flue, by which means the whole of the said flue in contact with the water in the boiler becomes utilized as heating-surface, and, consequently, the maximum heating effect is obtained in proportion to the quantity of fuel consumed. The adjustable deflector B (shown in the first three figures of the drawing) has a central spindle, $a$, the upper end of which turns in a block, $b$, and its lower end in a tripod, $d$, which can be tightened by means of set-screws. The deflector can be adjusted at any angle, or directly across the flue, as shown in Fig. 2, by means of a long operating-rod, $e$, with which it is provided. The fixed deflector (illustrated in Fig. 4) consists of a circular disk, supported within the flue by three studs, $h$, resting upon or secured to said flue. We propose, in some instances, to construct the deflector in the form of a cylinder, either solid or filled with water, and extending through a portion of the flue, so as to form a tubular or annular flame-space.

We claim as our invention—

The combination of the within-described internal deflector B with the flue A of a steam-boiler, substantially as and for the purpose described.

RICHARD HARWOOD.
   GEORGE HARWOOD.
   JOHN SCHOLES.
   THOMAS SEYMOUR.

Witnesses:
 THOMAS E. DAVIES,
 JOHN HUGHES.